Sept. 6, 1949. J. NEUFELD 2,481,034
APPARATUS FOR DETERMINING LIGHT CHARACTERISTICS
OF CLOUDS BY REFLECTION
Filed Sept. 25, 1944

INVENTOR
Jacob Neufeld

Patented Sept. 6, 1949

2,481,034

UNITED STATES PATENT OFFICE 2,481,034

APPARATUS FOR DETERMINING LIGHT CHARACTERISTICS OF CLOUDS BY REFLECTION

Jacob Neufeld, Tulsa, Okla.

Application September 25, 1944, Serial No. 555,742

6 Claims. (Cl. 88—14)

My invention relates particularly to a method and a means for studying the structure of clouds.

It is a purpose of my invention to provide an index representing the structural characteristics of clouds. As is well known, clouds differ one from another in their structural characteristics, particularly in the size of cloud droplets and the number of cloud particles per unit volume and the liquid water content of clouds.

It is a further purpose of my invention to determine the structure of a cloud in conjunction with and simultaneously with the measurement of the height of the cloud above the earth's surface.

In accordance with my invention, the structure of clouds is determined by utilizing the property of clouds to reflect or to scatter the impinging light. It is well known that clouds are never a pure dry mixture of gases, but rather a colloidal substance; that is to say, an aerosol, a suspensoid, with air as the medium, and containing in suspension particles of fog or cloud. The fog particles are larger on the average and cover a wider range of diameters. The extremes are about 1 $\mu$ and 120 $\mu$ although in coastal fogs the maxima occur at particle diameters ranging from 12 to 90 $\mu$ with a marked predominance between 40 $\mu$ and 50 $\mu$.

It is well known that a medium such as a cloud has the ability of scattering and reflecting a beam of light impinging thereon, and that the coefficient of scattering or reflection is different for each frequency component of the spectrum of the impinging light and varies from one frequency component to another in a definite relationship to the size of the particles that enter into the structure of the cloud. It is well known, for instance, that the scattering coefficient is a complex function of the ratio of the particle diameter and the wave length of the light. For the special case of particles that are small compared to the wave length, Rayleigh showed that the scattering coefficient varied inversely as the fourth power of the wave length. The variation of the scattering and reflection coefficient, when the particles are not small compared to the wave length, has been treated by Stratton and Houghton for the case of spherical water drops in air. The scattering coefficient was found to be $\pi n r^2 K$ where $r$ is the ratio of the drops, $n$ the number of drops per unit volume of air, and $K$ is a function of $$\frac{2\pi}{\lambda}$$

where $\lambda$ is the wave length. Further particulars regarding the scattering and reflection coefficient for various media can be found in an article by Henry G. Houghton on "The Transmission of light in the atmosphere with application to aviation," Journal of the Aeronautical Sciences, vol. 9, No. 3, January 1942.

It is, therefore, apparent from the above that clouds exhibit certain selective reflection characteristics that are referred particularly to certain frequency ranges within the spectrum of the impinging light. Furthermore, various clouds that differ one from the other in their structural characteristics show selective reflection properties that also differ one from the other in relation to the corresponding structural characteristics. We may say, therefore, that for a given cloud the manner in which various frequency components of the impinging light are being reflected, and relative values of the reflection coefficients corresponding to these frequency components, depend upon the size of cloud droplets and othr structural characteristics of the cloud.

My method consists, essentially, in selecting two frequency components that are, if possible, far apart in the frequency spectrum of the impinging light, measuring the reflection coefficients of these two frequency components, providing an index representing the relative values of these reflection coefficients, as, for instance, the quotient obtained from the division of one of the reflection coefficients into another. It is apparent that this index depends upon the size of particles entering into the structure of the cloud, and my invention consists, therefore, in using this index as indicative of the nature of clouds.

A particular advantage of my invention consists in combining the new instrumental means for determining the structure of clouds with well known instrumental means for determining the height of clouds, and thus performing all the required measurements simultaneously. Thus, in accordance with my invention, I project from a predetermined base line located on the earth a light beam having a known spectral distribution upwards into the atmosphere in the direction of a cloud, receiving the beam after reflection from the cloud, and indicating or recording the distance from the earth's surface to the base of the cloud as a function of the angular inclination of the received reflected beam. Simultaneously, I determine the spectral distribution of the received beam, particularly in its relation to the spectral distribution of the transmitted beam, and in particular, I measure the response of the reflecting base of the cloud to various frequency components within the spectral range of the impinging light. This response is translated into a numerical index which serves to designate the character of the cloud's surface.

My invention will be better understood when considered in connection with the accompanying drawings in which.

Figure 1:
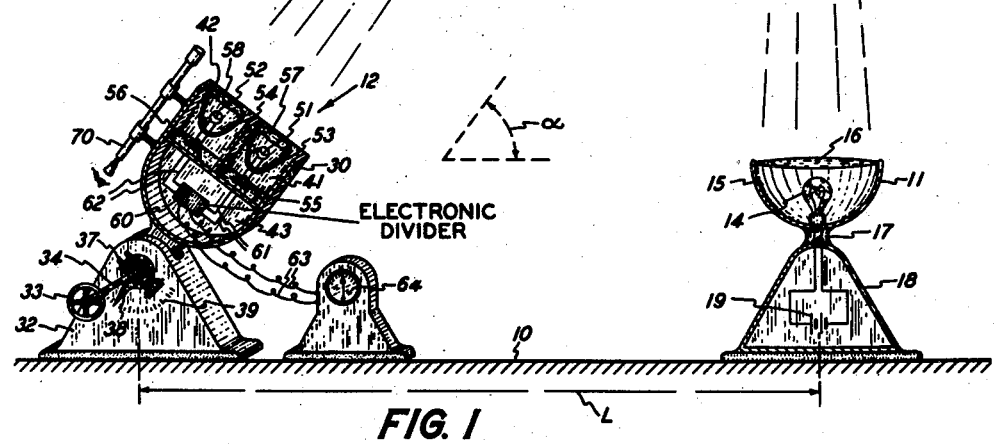
Fig. 1 represents schematically an arrangement for measurement of the height of a cloud and for a simultaneous measurement of a characteristic of said cloud.

Referring now more particularly to Fig. 1, the numeral 10 designates a landing field for airplanes, dirigibles, and similar aircraft, on which is positioned a light projector 11 and a light receiver 12; the projector and receiver being spaced apart by the distance L, which may be, for instance, 1500 feet. The light projector 11 comprises a lamp 14 positioned in the housing 15 which supports the lens 16, and is supported by the stud 17 and standard 18. The lamp 14 has been illustrated in the form of an incandescent lamp supplied by the battery 19. It is apparent, however, that any other source of light may be used. For the purposes of the present invention, it is, however, important that the light emitted by the lamp 14 be not monochromatic; i. e., that it emits at least two significant spectral components, the wave lengths of which are relatively distant one from the other. A typical example of a search lamp to be used for the present purpose consists of a 12 volt, 420 watt aeroplane landing-light lamp and a 16-inch primary mirror, projecting a narrow beam of light 20 of about 2° spread with a maximum intensity of about three million candles. As shown in the figure, a beam of light 20 is projected in the upward direction on the base of a cloud or a fog bank 21. The beam 20 produces a spot 22 on the underside of the cloud or fog bank 21. The spot 22 results from the light that is being reflected and scattered by the cloud or fog bank back towards the earth. A portion of the scattered or reflected light, which is designated by the beam 25, is reflected towards the light receiver 12.

The light receiver 12 is located in an orientable case or housing 30, which is supported by a standard 32. The housing 30 is arranged so that it may be tilted manually with respect to the standard 32 by means of a handle 33. The handle 33 is made to rotate the shaft 34 and thereby to displace angularly the housing 30 to various values of angular elevation. Securely attached to the housing is a pointer 38 which traverses the scale 39 and indicates the angle of elevation of the housing 30 with respect to some predetermined altitude. The clamping bolt serves to rigidly fix the position of the housing 30 with respect to the standard 32 at any chosen orientation.

The housing 30 is subdivided into three compartments 41, 42, and 43. The compartments 41, 42 are contained in the upper portion of the housing 30 and contain two photocells 51, 52, respectively, said photocells being provided with parabolic reflectors 53, 54 and connected to amplifiers 55, 56, respectively. The photocells 51, 52 are adapted to receive light from outside through light filters 57, 58 that are tightly secured to the parabolic reflectors 53 and 54, respectively, so as to form two closed compartments, each of said compartments containing a photocell. The filter 57 is the type that transmits only infrared radiations, and the filter 58 is of the type that admits only ultraviolet radiations. Consequently, the photocell 52 is responsive only to a limited portion of the frequency band comprised in the impinging light, said frequency band consisting mostly of ultraviolet radiations. Similarly, the photocell 51 is responsive only to another portion of the frequency band, i. e. infrared radiations.

The compartment 43 is contained in the lower portion of the housing 30 and contains an electronic divider 60 that is connected through the leads 61, 62 to the output terminals of the amplifiers 55 and 56, respectively. The output terminals of the electronic divider are connected by means of leads 63 to an indicating meter 64.

The electronic divider is arranged in such a manner that the output terminals connected to the indicator 64 produce a voltage which represents the ratio of the input voltages derived from the outputs of the amplifiers 55 and 56, respectively. The electronic divider may be of the type described in the U. S. Patent 2,129,880, issued on September 13, 1938, to S. A. Scherbatskoy and J. Neufeld on Thermionic measuring device.

The housing 30 has fastened thereon a telescope 70 arranged for visual observation of the clouds.

The beam 20 has remarkably sharp edges and presents a very striking appearance, under conditions of good visibility, and without a moon the spot is visible at ceiling heights of at least 15,000 feet. In accordance with the present invention, an observer is located at the position occupied by the receiver 12, i. e. at a distance $L=1500$ feet from the projector, and turns manually the housing 30 around the axis 34 by means of the wheel 33, while simultaneously observing the cloud 21 by means of the telescope 70. As soon as the observer locates through the telescope 70 the spot 22 on the surface of the cloud, he fixes the corresponding position of the housing 30 by means of the clamping bolt 37, and subsequently determines the inclination of the case by means of the pointer 38 movable with respect to the scale 39. The geometry of this problem is extremely simple. Let $\alpha$ be the angular elevation of the spot as viewed from the point at which the receiver is located, and let Z be the ceiling height. Then $$Z = L \tan \alpha$$

The object of my invention does not consist, however, in the measurement of the ceiling height Z as outlined above, since such measurements are well known in the art and have been widely practiced heretofore. It is, however, my object to investigate the nature of the cloud 21, and this is accomplished by means of the arrangement including the photocells 51, 52, filter 57, 58, electronic divider 60, and meter 64.

As shown in the drawing, the cloud 21 receives from the projector 11 a beam of light having a predetermined and known frequency spectrum that depends upon the nature of the source of light contained in the projector, and the absorptive characteristics of the atmosphere between the projector 11 and the cloud 21. In case of clear weather the spectral distribution of light as it travels through the atmosphere remains substantially unaffected, and, therefore, we may assume that the spectral distribution of the light impinging upon the cloud 21 is known and determined by the characteristics of the light source contained in the projector 11.

It is apparent that various frequency components entering into the spectrum of the impinging light are being reflected by the cloud in such a manner that each frequency component has its coefficient of reflection that is different from the reflection coefficient of the neighboring frequency components. Furthermore, the relationship, in accordance with which the reflection coefficient varies with the frequency, depends upon the size of the particles entering into the structure of the cloud, i. e. upon the nature of the cloud. My invention consists in selecting two particular frequency components in the spectrum of the reflected light. In the particular example illustrated herein I am selecting two frequency components that are located in the ultraviolet and infrared ranges, respectively. I am accomplishing this by using filters 57 and 58, the filter 57 being adapted to transmit said selected component in the infrared range and to eliminate all other components, and the filter 58 being adapted to transmit said selected component in the ultraviolet range and to eliminate all other components. I, subsequently, cause said two selected frequency components to impinge upon the photocells 51 and 52, respectively. It is apparent that the outputs of the photocells 51 and 52 represent the corresponding intensities of the reflected infrared and ultraviolet rays impinging thereon.

It has been stated in the preceding paragraphs that the spectral distribution of the light beam derived from the projector 11 is known and that this spectral distribution remains substantially unaffected as the beam travels through the atmosphere towards the cloud 21. As an example, we may assume a spectral distribution in which the selected frequency component in the infrared range is equal to the selected frequency component in the ultraviolet range. These two frequency components are reflected by the cloud 21 and produce in the reflected beam 25 the reflected components that are not any more equal one to the other, since the coefficient of reflection of the cloud that corresponds to the infrared ray is different from the coefficient of reflection that corresponds to the ultraviolet ray. It is, therefore, apparent that the intensities of these two reflected rays when compared to each other are indicative of the relative values of the corresponding reflection coefficients. In the arrangement shown in the drawing, the output currents derived from the photocells 51 and 52 are indicative of the values of the coefficients of reflection corresponding to these two frequency components. The outputs of the photocells 51, 52 are subsequently applied to the electronic divider 60, and consequently, the voltage appearing across the output terminals of the electronic divider represents the ratio of the reflection coefficients of the cloud 21 that are associated with an infrared ray and an ultraviolet ray, respectively. The output voltage derived from the electronic divider is shown on the meter 64.

It is now apparent that the meter 64 provides an index representing the relative values of the reflection coefficients of the cloud that correspond to an infrared and to an ultraviolet radiation, respectively. It is obvious that these two reflection coefficients depend upon the size of cloud particles and other characteristics of the cloud and, consequently, the index provided by the meter 64 has a definite functional relationship to the characteristics of the cloud and differs from one cloud to another in dependence upon the cloud's structure.

My invention consists, therefore, in measuring the elevation of the cloud by means of the angle $\alpha$ and in simultaneously determining a characteristic of the cloud by means of the indication provided by the meter 64.

It is apparent that the essential feature of my invention consists in projecting towards a cloud a beam of radiant energy of a determined frequency composition that may comprise ultraviolet visible and infrared radiation and in investigating the frequency composition of the radiant energy reflected by the cloud. As stated hereinabove the structural characteristics of the cloud, i. e. size of water particles, determine the coefficient of reflection of cloud at various frequencies and in accordance with the preesnt invention I select a beam comprising a plurality of frequencies and determining the relative values of reflection coefficients corresponding to these individual frequencies. For purpose of illustrating the present invention only radiation of two frequencies have been utilized and namely, the radiation comprised in the ultraviolet and infrared range. It is obvious, however, that radiation of a plurality of frequencies can be used. The gist of this invention consists in measuring the beam of radiant energy reflected by the cloud. It is apparent that the beam is characterized by two parameters that are entirely unrelated one to the other. One of these parameters represents the intensity of radiations comprised in the beam, and the other parameter represents the frequency spectrum of these radiations. My invention consists, specifically, in providing by means of the meter 64 an index representing the frequency spectrum of the reflected beam and not the intensity of the beam. It can be readily appreciated that the intensity of a beam and the frequency spectrum of a beam are entirely independent one of the other; that is, one can have a beam of radiations of a large intensity and of a small frequency index, and one may also have a beam of radiations of small intensity and of a large frequency index. In other words the intensity of radiation is a measure of a total quantity of radiation associated with the beam and the frequency index is a quality index that is independent of the quantity, which represents essentially the frequency amplitude spectrum of the radiation and which is measured by the ratio of the intensities.

Figure 2:
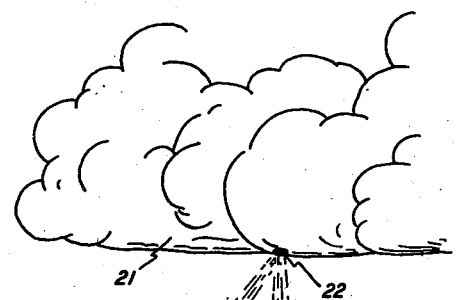
Fig. 2 and Fig. 3 represent diagrammatically two beams of radiant energy that differ one from the other in their intensity but have the same spectral index. These two figures are herewith included in order to more clearly understand the nature of the spectral index provided in this invention.
Figure 2:
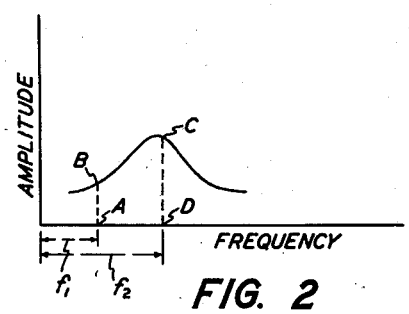
Figure 3:
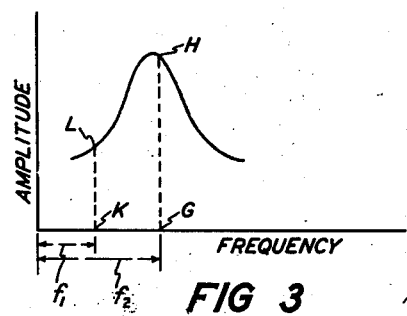

In order to see more clearly the above distinctions, consider Figures 2 and 3. These figures represent two radiations having a similar frequency-amplitude distribution, that is, having the same frequency index. However, the radiation of Figure 3 is twice as intense as the radiation corresponding to Figure 2, since the amplitudes of the corresponding frequency components are twice as large in Figure 3.

In order to measure the frequency spectrum, or the ratio of intensities two representative frequencies have been selected that are located in the infrared and ultraviolet range, respectively, and that may be designated by symbols $f_1$ and $f_2$. The index provided by the meter 64 represents the ratio of amplitudes corresponding to these frequencies. Consequently, the frequency index of the radiation in Figure 2 is the same as the one in Figure 3, since the ratios of the respective amplitudes are equal one to the other, that is $$\frac{AB}{CD}=\frac{GH}{KL}$$

However, the amplitudes of the frequency components are twice as large in Fig. 3 when compared to the corresponding amplitudes of Fig. 2. In particular, the amplitude KL corresponding to the frequency $f_1$ in Fig. 3 is twice as large as the amplitude AB in Fig. 2, and the amplitude GH corresponding to the frequency $f_2$ in Fig. 3 is twice as large as the corresponding amplitude CD in Fig. 2.

It should be noted in connection with the above that only ratios and not differences can be used as indicative of the frequency spectrum, that is, one cannot represent the frequency index of the radiations of Figure 2 as $$CD-AB$$

or the frequency index of the radiations in Figure 3 as $$GH-KL$$

If such a representation is adopted then it will follow that the frequency index of Figure 3 is twice as large as the one of Figure 2, because $$GH-KL=2(CD-AB)$$

This obviously is not true.

It is desired to emphasize the fact that the spectral index as measured herein is a different parameter that is not at all related to the intensity of the relating radiations, that is, in many instances the intensity of the radiations, may be very small, but the spectral index or ratio of intensities of two selected components of said radiations, large, and on the contrary in other cases the intensity may be large, but the spectral index may be very small. The only practical way of measuring the spectral index of the reflected beam consists in selecting two frequencies from the reflected radiant energy and indicating their ratio.

In claims the term "light" is meant to include any form of visible and invisible light, said invisible light comprising infrared and ultraviolet radiations.

I claim:
1. An arrangement for investigating the height and a characteristic of a cloud bank above the earth's surface, comprising a source of light mounted upon the earth's surface to project a beam of light of known spectral distribution toward said cloud bank, whereby a light spot is formed at the lower surface of said cloud bank, a housing positioned upon the earth's surface at a known distance from said source of light, two light sensitive elements and a telescope fixedly mounted on said housing, the axes of said telescope and said housing being in a parallel relationship one to the other, said elements being adapted to respond differently one from the other to various frequency components entering into the spectral distribution of the reflected beam of light, a support, and means rotatably mounting said housing upon said support for rotation in a plane defined by the projected and reflected light beams whereby said telescope may be aligned in the direction of said spot by effecting a suitable rotatory displacement of said housing with respect to said support, an indicating member and a graduated scale in operative relationship with said member, said member and said scale coacting with said housing and said support, whereby the rotatory displacements of said housing are indicated by said member upon said scale, and means responsive to the outputs of said elements for providing an index representing the ratio of said outputs, said index representing the characteristic of said cloud bank.

2. An arrangement for investigating the height and a characteristic of a cloud bank above the earth's surface, comprising a source of light mounted upon the earth's surface to project a beam of light of known spectral distribution toward said cloud bank, whereby a light spot is formed at the lower surface of said cloud bank, a housing positioned upon the earth's surface at a known distance from said source of light, two light sensitive elements and a telescope fixedly mounted on said housing, the axis of said telescope being parallel to said housing, said elements being adapted to respond differently one from the other to various frequency components entering into the spectral distribution of the reflected beam of light, a support, and means for rotatably mounting said housing upon said support for rotation in a plane defined by the projected and reflected light beams, whereby said telescope may be aligned in the direction of said spot by effecting a suitable rotatory displacement of said housing with respect to said support, an indicating member and a graduated scale in operative relationship with said member, said member and said scale coacting with said housing and said support, whereby the rotatory displacements of said housing are indicated by said member upon said scale, and means for comparing the outputs of said elements for determining the characteristic of said cloud bank.

3. In an arrangement for investigating a characteristic of a cloud bank above the earth's surface, a first housing positioned upon the earth's surface and comprising a source of light adapted to project a beam of light of known spectral distribution toward said cloud bank, whereby a light spot is formed at the lower surface of said cloud bank, a second housing positioned upon the earth's surface at a known distance from said first housing, said second housing comprising two light sensitive elements and a telescope fixedly mounted parallel to the axis of said second housing, said elements being adapted to respond differently one from the other to various frequency components entering into the spectral distribution of the reflected beam of light, and means for comparing the outputs of said elements, a support, means for rotatably mounting one of said two housings upon said support for rotation in a plane defined by the projected and reflected light beams whereby said telescope may be aligned in the direction of said spot, an indicating member and a graduated scale in operative relationship with said indicating member, said member and said scale coacting with said rotatable housing and said support whereby the rotatable displacements of the housing are indicated by said member upon said scale.

4. An apparatus for determining characteristics of a cloud above the earth's surface comprising means positioned upon the earth's surface for projecting a beam of light toward said cloud, whereby a spot of light is formed at the lower surface of said cloud, a second means positioned upon the earth's surface at a known distance from said first means for receiving light reflected by said cloud, a pivotal mounting for one of said two means for an oscillating movement of said means through a predetermined angle, a movable indicating member operated in a definite relationship to said oscillating movement and cooperating with a plurality of angle identifying legends thereon corresponding to different angular positions of said pivotally mounted means with respect to a reference line, a telescope rigidly mounted in said second means, the axes of said telescope and said second means being parallel one to the other whereby the axis of said telescope may be aligned in the direction of said spot by effecting a suitable rotatory displacement of one of said two means, a receiving device in said second means, said device comprising two elements sensitive to light and adapted to respond differently one from the other to various frequency components of the spectral distribution of light, and means responsive to the outputs of said elements to produce an indication of the characteristic of said cloud.

5. An arrangement for investigating the height and a characteristic of a cloud bank above the earth's surface, comprising a source of light mounted upon the earth's surface to project a beam of light of known spectral distribution toward said cloud bank, whereby a light spot is formed at the lower surface of said cloud bank, a housing positioned upon the earth's surface at a known distance from said source of light, two light sensitive elements and a telescope fixedly mounted on said housing, the axis of said telescope being parallel to said housing, said elements being adapted to respond differently one from the other to various frequency components entering into the spectral distribution of the reflected beam of light, a support, and means for rotatably mounting said housing upon said support for rotation in a plane defined by the projected and reflected light beams, whereby said telescope may be aligned in the direction of said spot by effecting a suitable rotatory displacement of said housing with respect to said support, an indicating member and a graduated scale in operative relationship with said member, said member and said scale coacting with said housing and said support, whereby the rotatory displacements of said housing are indicated by said member upon said scale, and means for producing signals representing the output of said elements, said signals representing the characteristic of said cloud bank.

6. In an arrangement for investigating a characteristic of a cloud bank above the earth's surface, a first housing positioned upon the earth's surface and comprising a source of light adapted to project a beam of light of known spectral distribution toward said cloud bank, whereby a light spot is formed at the lower surface of said cloud bank, a second housing positioned upon the earth's surface at a known distance from said first housing, said second housing comprising two light sensitive elements and a telescope fixedly mounted parallel to the axis of said second housing, said elements being adapted to respond differently one from the other to various frequency components entering into the spectral distribution of the reflected beam of light, and means for producing signals representing the outputs of said elements, a support, means for rotatably mounting one of said two housings upon said support for rotation in a plane defined by the projected and reflected light beams whereby said telescope may be aligned in the direction of said spot, an indicating member and a graduated scale in operative relationship with said indicating member, said member and said scale coacting with said rotatable housing and said support, whereby the rotatable displacements of the housing are indicated by said member upon said scale.

JACOB NEUFELD.

REFERENCES CITED

The following references are of record in the file of this patent:

UNITED STATES PATENTS

| Number | Name | Date |
|---|---|---|
| 1,949,619 | Pfund | Mar. 6, 1934 |
| 2,008,410 | Wilson | July 16, 1935 |
| 2,081,134 | Buckley | May 25, 1937 |

OTHER REFERENCES

"A New Color-Separator," an article by Richter in Electronics, for March 1937, pp. 28 and 29 cited.